Oct. 29, 1929.   N. H. MYERS ET AL   1,734,018
METHOD AND APPARATUS FOR MAKING BEAD MATERIAL
Filed March 8, 1926   2 Sheets-Sheet 1
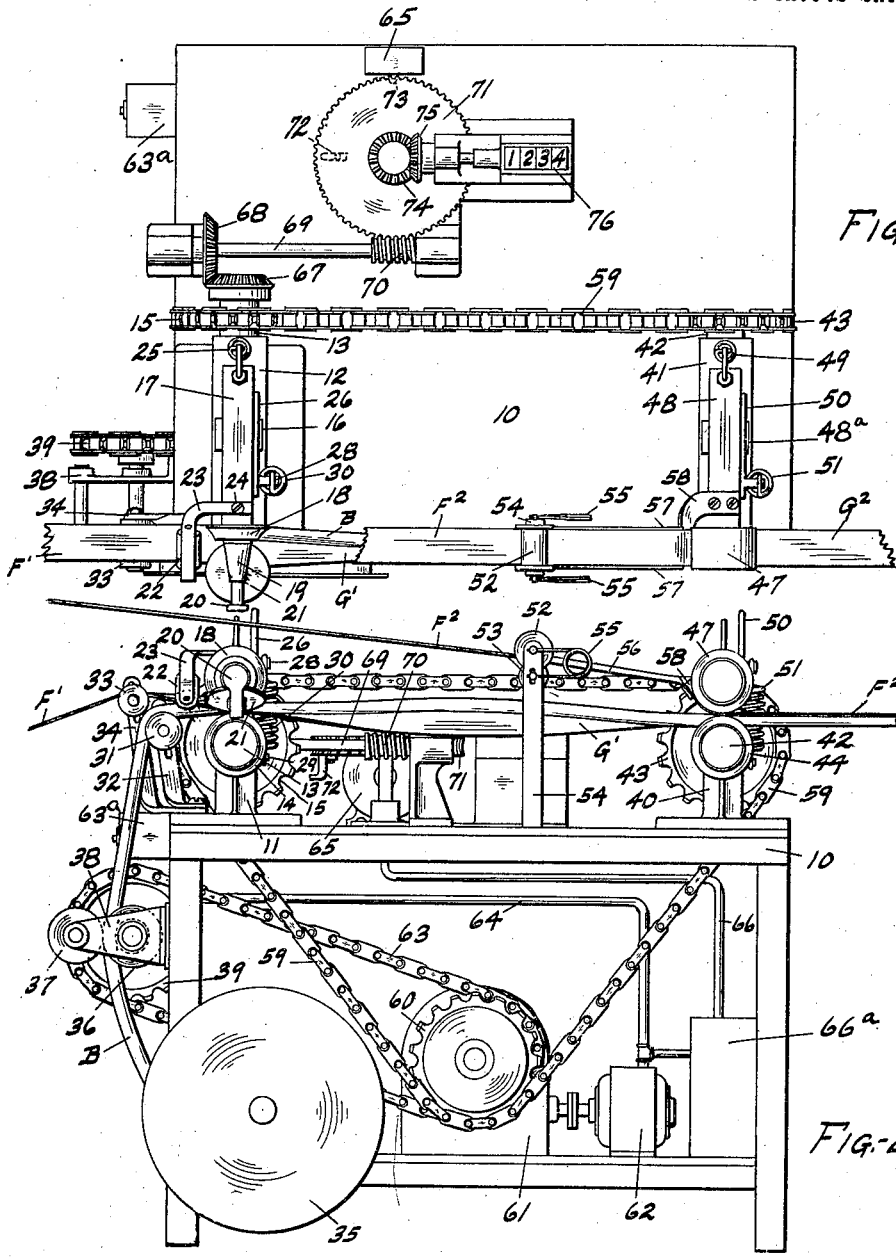
INVENTOR.
NELSON H. MYERS
ELDEN E. LEACH
BY
ATTORNEY.

Oct. 29, 1929. N. H. MYERS ET AL 1,734,018
METHOD AND APPARATUS FOR MAKING BEAD MATERIAL
Filed March 8, 1926   2 Sheets-Sheet 2
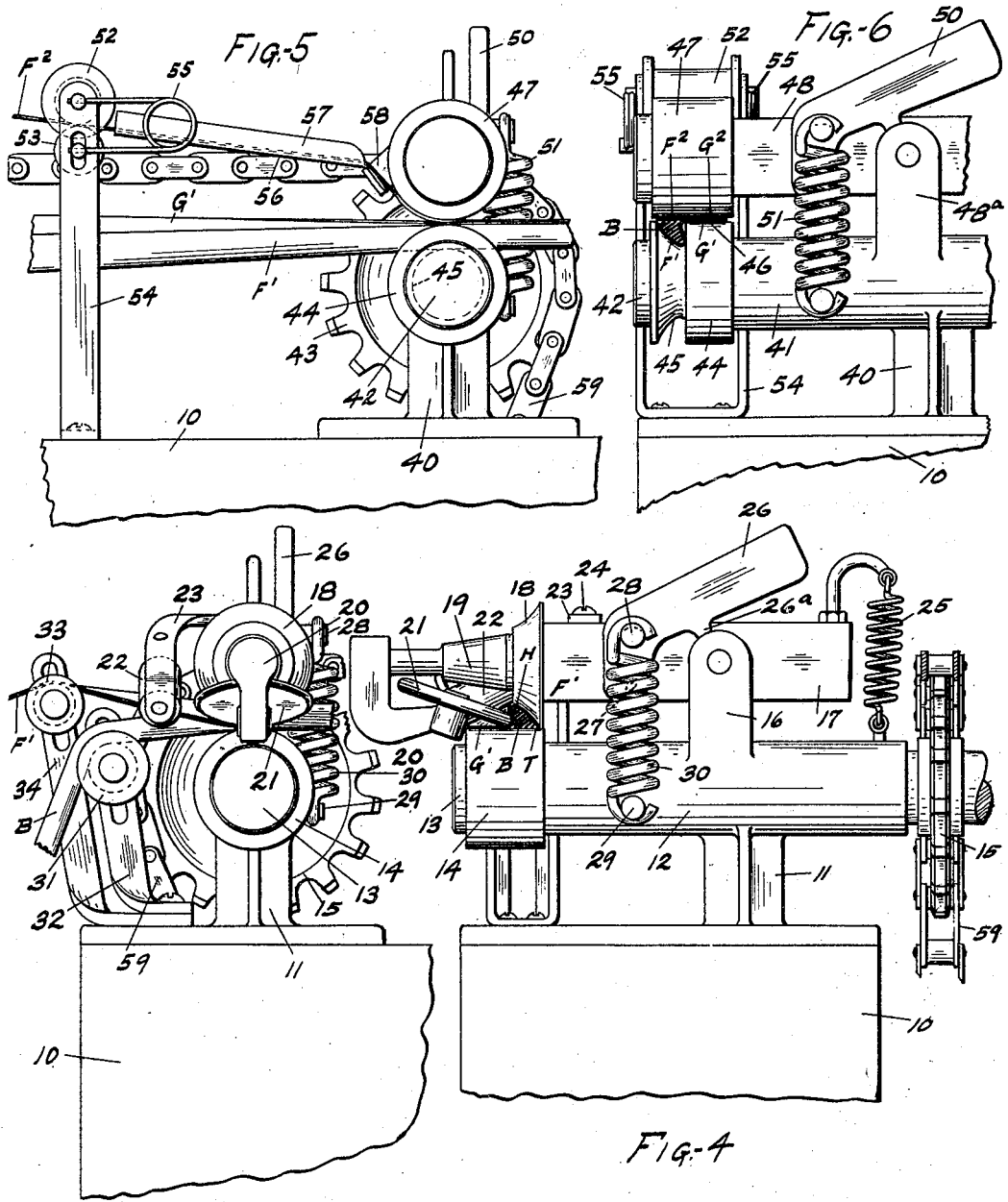
INVENTOR.
NELSON H. MYERS
ELDEN E. LEACH
BY
ATTORNEY.

Patented Oct. 29, 1929

1,734,018

UNITED STATES PATENT OFFICE

NELSON H. MYERS AND ELDEN E. LEACH, OF AKRON, OHIO, ASSIGNORS TO THE FIRESTONE TIRE AND RUBBER COMPANY, OF AKRON, OHIO, A CORPORATION OF OHIO

METHOD AND APPARATUS FOR MAKING BEAD MATERIAL

Application filed March 8, 1926. Serial No. 92,987.

This invention relates to methods and apparatus for making bead material for use in pneumatic tire casings of the clincher type.

The chief objects of the invention are to provide a method and an apparatus for continuously reinforcing or "flipping" bead material in continuous strip form.

Further objects are to provide improved devices for applying rubberized fabric reinforcing strips to tire bead cores of generally triangular formation.

The foregoing and other objects are obtained and adapted to be carried out by the apparatus illustrated in the accompanying drawings and described below. It is to be understood that the invention is not limited to the apparatus illustrated and described, nor to the particular process herein disclosed.

Of the accompanying drawings,

Figure 1 is a plan view of a bead material reinforcing machine;

Figure 2 is a side elevation thereof;

Figure 3 is a detail side elevation of one reinforcing strip applying mechanism;

Figure 4 is a detail end elevation thereof;

Figure 5 is a detail side elevation of another reinforcing strip applying device; and Figure 6 is an end elevation thereof.

Referring to the drawings, 10 illustrates a supporting table on which the various instrumentalities of the apparatus are mounted. Table 10 has mounted on its upper surface a bracket 11 having a bearing 12 therein for a shaft 13 having thereon a transversely flat-surfaced roller 14 and adapted to be driven by a sprocket 15 on shaft 13. On the top of bearing housing 12 is formed a bracket 16 on which is pivoted an arm 17 having a roller 18 journaled thereon and so formed in profile as to be adapted to fit against the upper surface of a strip of bead material B, the inner surface of which is resting on roller 14, the roller 18 engaging said strip on the outer surface thereof between what is termed the toe T and the heel H of the bead.

The roller 18 is journaled on a spindle 19 carried by arm 17 and which is formed so as to project forwardly of roller 18 and has a downwardly depending and rearwardly extending arm 20 thereon on which is journaled a roller 21 so shaped as to fit into the concave portion of bead strip B on roller 14 between the heel H and the inner surface of the strip. Rollers 18 and 19 are thus adapted, in combination, to apply and form a strip of reinforcing fabric indicated at F' over the outer surface of a bead strip resting on roller 14 to provide an outer covering for the bead and a flipper portion G' by which anchoring of a completed bead in the tire is facilitated. For guiding the fabric strip F' into proper relation to rollers 18 and 21 to be evenly and accurately applied to strip B, an inclined roller 22 is provided in advance of rollers 14, 18 and 21 and is so arranged as to direct the fabric F' in substantially tangential relation to the curve of the heel of the bead strip (Figure 4). Roller 22 is preferably journaled on a bracket 23 secured at 24 on arm 17.

Arm 17 is arranged so as to carry rollers 18, 21 and 22 away from roller 14 to facilitate initial threading of the bead strip B and fabric strip F' through the device. To this end, one end of arm 17 is connected to bearing housing 12 by means of a tensile spring 25 normally tending to swing arm 17 upwardly to carry the above rollers away from roller 14. A manually operable arm 26 is pivoted at 27 on arm 17 and has thereon a stud 28 which is connected to a fixed stud 29 on bearing housing 12 by means of a strong tensile spring 30. Arm 28 is movable from the position shown (Figure 4), in which spring 30 is directed on one side of pivot 27 tending to swing arm 26 to the right, to a position to the left of that shown (Figure 4), in which the spring 30 will be directed to the left of pivot 27. Arm 26 has a stop 26ª thereon arranged to engage bracket 16 to limit swinging of arm 26 beyond a point at which spring 30 will be directed slightly to the right of pivot 27 and thus, since spring 30 is stronger than spring 25, will urge rollers 18, 21 and 22 toward roller 14. Since movement of arm 26 to the left is unlimited, stud 28 will move to a point at which tension in spring 30 will be expanded and spring 25 will accordingly elevate rollers 18, 21 and 22 from rollers 14.

The guiding of the bead strip material B into the above-described device is accomplished by means of a flanged idler roller 31 adjustably mounted in a slotted bracket 32 on table 10. The guiding of the fabric strip F' to the above-described device is accomplished by means of a flanged roller 33 journaled in a slotted bracket 34.

The supply of bead strip material B may be provided on a reel 35 adapted to be removably mounted in any suitable way on table 10 beneath the surface thereof and the material may be withdrawn from said reel by a pair of cooperating rollers 36 and 37, journaled in brackets 38, 38, the roller 36 being flanged and the roller 37 extending between the flanges thereof into frictional contact with bead material passing between the flanges. Roller 36 may be driven by a sprocket 39. The fabric F' may be drawn from any suitable source.

Arranged on table 10 in spaced relation from, but in alignment with bracket 11 is a second bracket 40 having thereon a bearing 41 in which is journaled a shaft 42 adapted to be driven in a manner similar to shaft 13 by a sprocket 43. Shaft 42 has thereon a roller 44 aligned with roller 14, but being formed with a groove as at 45 shaped to receive the bead strip B extending from the first fabric strip applying device and twisted so that its inner surface will face upwardly, roller 44 having a transversely flat surface 46 for supporting the flipper portion G' of strip F'.

Arranged for cooperation with roller 44 is a transversely flat-surfaced roller 47 journaled on an arm 48, similar to arm 26, and similarly pivoted as on a bracket 48ª and adapted to move roller 47 from or toward roller 48 by means of a spring 49, arm 50 and spring 51, respectively similar and mounted in the same way as spring 25, arm 26 and spring 30. Roller 47 is adapted to apply a fabric strip F² on the inner surface of the bead strip B to cover said inner surface and also to provide a flipper portion G² pressed into intimate contact with the flipper portion G' of strip F'.

Guiding of strip F² from any suitable source of supply (not shown) may be accomplished by means of rollers 52 and 53, the roller 52 being flanged and roller 53 engaging between the flanges, roller 52 being journaled in fixed bearings in a U-bracket 54 and rollers 53 being journaled so as to be vertically movable therein. Springs 55—55 are arranged to yieldingly hold roller 53 in contact with roller 52. Between rollers 52 and 53 and the second fabric applying device the strip F² is guided by an inclined supporting plate 56 formed with flanges 57 on the opposite edges thereof to provide a guiding trough, plate 56 being secured on a bracket 58 connected to arm 48 so as to guide strip F² in proper relation to rollers 44 and 47.

Rollers 14 and 44 are adapted to be driven at the same speed by a common chain 59 passing over sprockets 15 and 43 and over a sprocket 60 driven through a suitable reduction 61 by a motor 62. Roller 36 may be driven at the same speed as rollers 14 and 44 by a chain 63 passing over sprocket 39 and a second sprocket (in the rear of sprocket 60 in Figure 2). Reinforced bead material issuing from the machine may be wound on a suitable reel (not shown) and carried to tire building or other machines for further operations.

It is desirable in devices of this character to provide means indicating the output thereof in reels of bead material completed, and also to supply each reel with substantially a uniform amount of stock, whereby the output in feet of material is known and also waste at the tire building machines may be minimized. To these ends, motor 62 is arranged to be started by a hand switch 63ª connected thereto by leads extending through a conduit 64 and to be stopped by an automatic switch 65 connected thereto by leads extending through a conduit 66, a relay box 66ª being employed with the motor in the customary manner. Switches 63ª and 65 are of standard forms and need not be illustrated in detail.

Switch 65 is controlled from the apparatus driving means at any suitable point, such as by means of a gear 67 on shaft 13 and meshed with a gear 68 on a worm shaft 69 suitably journaled on table 10 and having a worm 70 thereon. Worm 70 is meshed with a worm gear 71 having thereon a pawl 72 adapted to engage a member 73 once on every revolution thereof (which corresponds to a certain length of material passing through the apparatus). Connected to gear 71 is a gear 74 meshed with the driving gear 75 of a suitable counter 76 adapted to indicate the output of the machine in numbers of reels. Thus the machine will stop automatically as each reel of stock is completed and will also count the number of reels produced by the machine for any given time.

In operation, the various strips B, F' and F² are initially threaded into the machine as shown, the strip B being twisted to invert it between the strip applying mechanisms. The machine is then continuously driven, strip F' being progressively applied and formed about one side of the bead, and strip F² being successively applied progressively against the other side and the flipper portions G' and G² being pressed into intimate contact. When a reel of reinforced bead material has been completed the machine is automatically stopped and awaits resetting of the machine by an operative who thus may attend to several machines resetting one, supplying reels of stock and initially threading the stock in the machine while the others are in operation.

Modifications of the invention may be resorted to without departing from the spirit thereof or the scope of the appended claims.

What is claimed is:

1. The method of reinforcing bead material in strip form which comprises continuously passing the strip with the outer surface facing upwardly past a point, applying a reinforcing strip wide enough to form a flipper portion progressively to and forming it about said bead material at said point, continuously passing the strip past a second point with a twist between said points, whereby its inner surface will be facing upwardly, and applying a second reinforcing strip wide enough to form a flipper portion to said material and pressing its flipper portion into intimate contact with the flipper portion of the first reinforcing strip at said second point.

2. The method of reinforcing bead material in strip form which comprises continuously passing the strip with the outer surface facing upwardly past a point, applying a reinforcing strip progressively to and forming it about said bead material at said point, continuously passing the strip past a second point with a twist between said points, whereby its inner surface will be facing upwardly, and applying a second reinforcing strip to said material at said second point.

3. A method for covering bead material comprising continuously driving the material with a half-twist therein at one point, applying one covering strip to the bead material in advance of said point, and applying a second covering strip to said material after it passes said point, whereby the bead material will be enclosed by said strips.

4. A method for covering bead material in strip form comprising continuously driving the material, progressively applying one covering strip to the material and pressing it into intimate contact therewith at one point, and progressively applying a second covering strip to the material and pressing it into intimate contact therewith at another point.

5. Apparatus for covering or reinforcing bead material, said apparatus comprising spaced apart rollers, said rollers being so spaced and so formed as to support a continuous strip of bead material thereon with the outer surface up on one and the inner surface up on the other, means for driving said rollers in unison, and means operable against each roller to apply a covering or reinforcing strip progressively onto the bead material thereon, each of said means including one or more pressure rollers, a mounting movable to carry said pressure roller or rollers out of cooperation with its bead supporting and driving roller, and releasable means normally holding each applying means in cooperation with its driving roller, one of said pressure rollers and its cooperating driving roller having surfaces for forming on the bead strip a lateral fin of reinforcing material and a guide carried by each mounting for directing covering material into proper relation with the bead material.

6. Apparatus for covering or reinforcing bead material, said apparatus comprising spaced apart rollers, said rollers being so spaced and so formed as to support a continuous strip of bead material thereon with the outer surface up on one and the inner surface up on the other, means for driving said rollers in unison, means operable against each roller to apply a covering or reinforcing strip progressively onto the bead material thereon, each of said means including one or more pressure rollers, and means for pressing together the projecting edges of the reinforcing material to form a lateral fin, a mounting movable to carry said pressure roller or rollers out of cooperation with its bead supporting and driving roller, and releasable means normally holding each applying means in cooperation with its driving roller.

7. Apparatus for covering or reinforcing bead material, said apparatus comprising spaced apart rollers, said rollers being so spaced and so formed as to support a continuous strip of bead material thereon with the outer surface up on one and the inner surface up on the other, means for driving said rollers in unison, and means operable against each roller to apply a covering or reinforcing strip progressively onto the bead material thereon, each of said means including one or more pressure rollers, and a pair of rollers for pressing together the overlapping, projecting edges of the reinforcing strip.

8. Apparatus for covering or reinforcing bead material, said apparatus comprising spaced apart rollers, said rollers being so spaced and so formed as to support a continuous strip of bead material thereon with the outer surface up on one and the inner surface up on the other, means for driving said rollers in unison, and means operable against each roller to apply a covering or reinforcing strip progressively onto the bead material thereon, each of said means including one or more pressure rollers.

9. Apparatus for covering or reinforcing bead material, said apparatus comprising spaced apart rollers, said rollers being so spaced and so formed as to support a continuous strip of bead material thereon with the outer surface up on one and the inner surface up on the other, means for driving said rollers in unison, and means operable against each roller to apply a covering or reinforcing strip progressively onto the bead material thereon.

10. Apparatus for reinforcing or covering bead material comprising means for driving a strip of said material with a half twist therein, means for progressively applying a covering strip on one side of said material, said means being operable on the material in advance of the twist, and means for progressively applying a covering strip to the other side of the material, said means being operable on the material after it passes the point of twisting.

11. Apparatus for continuously making reinforced or covered bead material comprising means for continuously driving a strip of bead material, and a plurality of means operable thereon in succession for applying different bead covering strips thereon.

12. In apparatus of the class described, means for driving bead material with the heel up including a roller on which the material is supported, and means for applying a strip of covering or reinforcing material onto the bead material on said roller, said means including a roller operable on the bead material between the toe and heel thereof, a roller operable on the bead in back of the heel, and means for directing the covering strip between the supporting roller and the applying rollers at an angle such that it will be directed onto the bead substantially tangentially of the heel thereof.

NELSON H. MYERS.
ELDEN E. LEACH.